Aug. 22, 1933. F. A. OZBURN 1,923,840
FISH LURE
Filed June 20, 1932
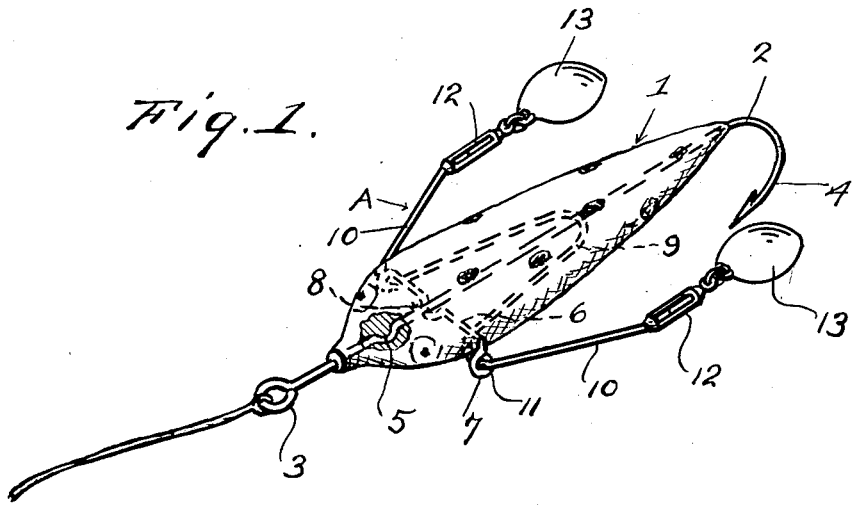
Fig.1.
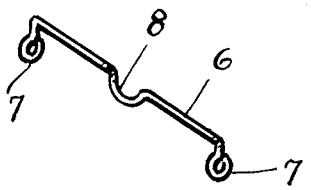
Fig.2.
Fig.3.
Inventor
F. A. Ozburn
By Clarence A O'Brien
Attorney Patented Aug. 22, 1933

1,923,840

UNITED STATES PATENT OFFICE 1,923,840

FISH LURE

Floyd Allan Ozburn, Los Angeles, Calif.

Application June 20, 1932. Serial No. 618,331.

3 Claims. (Cl. 43—39)

This invention relates to a fish lure, the general object of the invention being to provide a lure having a body part shaped to represent an insect, frog, or the like and having a member pivotally connected therewith which is provided with rearwardly extending arms at the sides of the body with which spinners are swivelled so that the device will act to attract fish thereto as it is drawn through the water.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a perspective view of the device with parts broken away.

Fig. 2 is a fragmentary view of the spinner carrying member.

Fig. 3 is a view of the cross bar to which the spinner carrying member is pivoted.

In this drawing, the numeral 1 indicates the body of the device which may be made to represent an insect, frog or the like and the shank of the fish hook 2 passes longitudinally through said body with its eye 3 at the front end of the body and the hook 4 projecting from the rear end thereof. The body may be formed entirely of metal or may have the head part formed of metal with the rest of wood or the like and if desired, the shank may be formed with a crimp 5 which helps to hold the body on the shank.

A cross bar 6 passes through the forward part of the body with its ends projecting from the sides of the body and these ends are bent downwardly and formed with the eyes 7. The center of the cross piece is formed with a crimp 8 so as to make the connection of the cross piece to the body of greater strength.

A member A is formed with a central substantially V-shaped part 9 with the arms 10 extending rearwardly from the ends of the limbs of said V-shaped part, the connection of the arms 10 with said limbs forming loops 11 which pass through the eyes 7 so that the member A has rocking movement on the body with the V-shaped member 9 engaging the bottom of the body and thus limiting swinging movement of said member A.

A swivel 12 is connected to the rear end of each arm 10 and a spinner 13 is attached to each swivel so that these spinners can rotate as the device is drawn through the water.

It will of course be understood that the body can be finished as desired and can have feathers and buck-tail attached thereto if desired. The position of the spinners 13 and their resistance to the water, acts to cause the device to submerge and as the device is pulled through the water the movement of the spinners will simulate the wings of an insect and thus fish will be attracted to the device.

When the head of the body is formed of metal and the rest of wood, the position of the blades and their resistance to the water combined with the light buoyance of the wood portion causes the device to submerge, when cast at an approximately 45° angle thus causing the automatic spinning attraction, of the blades.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:—

1. A fish lure comprising a body, a hook having its shank passing longitudinally thru the body, a member swingingly connected to the forward part of the body and having rearwardly and outwardly extending arms spaced from the sides of the body, a spinner swivelled on the rear end of each arm, and a part on said member for engaging a part of the body for limiting swinging movement of said member in one direction.

2. A fish lure comprising a body, a hook having its shank passing longitudinally thru the body, a member swingingly connected to the forward part of the body and having rearwardly and outwardly extending arms spaced from the sides of the body, a spinner swivelled on the rear end of each arm, and said member having a V-shaped portion at the center thereof for engaging a part of the body for limiting swinging movement of the member in one direction.

3. A fish lure of the class described comprising a body, a fish hook having its shank passing longitudinally through the body, a cross bar passing through the forward part of the body and having eyes at its ends located adjacent the sides of the body, a member having a substantially V-shaped central portion and rearwardly extending arms connected to the ends of the limbs of said V-shaped portion, said member passing through the eyes and having its V-shaped part adapted to engage a part of the body and its arms extending rearwardly and outwardly from the sides, the body, and spinners swivelled to the rear ends of said arms of said V-shaped part limiting swinging movement of the member in one direction.

FLOYD ALLAN OZBURN.